(12) United States Patent
Kambegawa

(10) Patent No.: US 11,418,384 B2
(45) Date of Patent: Aug. 16, 2022

(54) INFORMATION PROCESSING APPARATUS AND METHOD FOR CONTROLLING THE SAME

(71) Applicant: CANON KABUSHIKI KAISHA, Tokyo (JP)

(72) Inventor: Minoru Kambegawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/662,151

(22) Filed: Jul. 27, 2017

(65) Prior Publication Data

US 2018/0034687 A1 Feb. 1, 2018

(30) Foreign Application Priority Data

Aug. 1, 2016 (JP) .............................. JP2016-151027

(51) Int. Cl.
| | | |
|---|---|---|
| H04L 43/00 | (2022.01) | |
| H04L 41/0677 | (2022.01) | |
| G06F 13/40 | (2006.01) | |
| H04L 43/50 | (2022.01) | |
| H04L 43/0864 | (2022.01) | |
| H04L 43/16 | (2022.01) | |

(52) U.S. Cl.
CPC .......... H04L 41/0677 (2013.01); G06F 13/40 (2013.01); H04L 43/50 (2013.01); H04L 43/0864 (2013.01); H04L 43/16 (2013.01)

(58) Field of Classification Search
None
See application file for complete search history.

(56) References Cited

U.S. PATENT DOCUMENTS

2013/0031412 A1* 1/2013 Iwasaki .................. H04L 43/50
714/32

FOREIGN PATENT DOCUMENTS

| JP | S5658348 A | 5/1981 |
|---|---|---|
| JP | H02239354 A | 9/1990 |
| JP | H04182766 A | 6/1992 |
| JP | H11120155 A | 4/1999 |
| JP | 2000508453 A | 7/2000 |
| JP | 2001075880 A | 3/2001 |
| JP | 2003501880 A | 1/2003 |
| JP | 2003529145 A | 9/2003 |
| JP | 2006268556 A | 10/2006 |
| JP | 2006285519 A | 10/2006 |
| JP | 2007025880 A | 2/2007 |
| JP | 2008123135 A | 5/2008 |
| JP | 2010-245953 A | 10/2010 |

* cited by examiner

*Primary Examiner* — Willie J Daniel, Jr.
(74) *Attorney, Agent, or Firm* — Canon U.S.A., Inc. IP Division

(57) ABSTRACT

There is provided an information processing apparatus in which a plurality of modules including at least a first module and a second module is connected in a ring shape. The first module includes a first transmission unit configured to transmit predetermined data. The second module adjacent to the first module includes a second reception unit configured to receive the predetermined data transmitted by the first transmission unit, and a second transmission unit configured to transmit first attribute data including identification information for identifying a module when the predetermined data has not been received within a first predetermined time period.

21 Claims, 13 Drawing Sheets

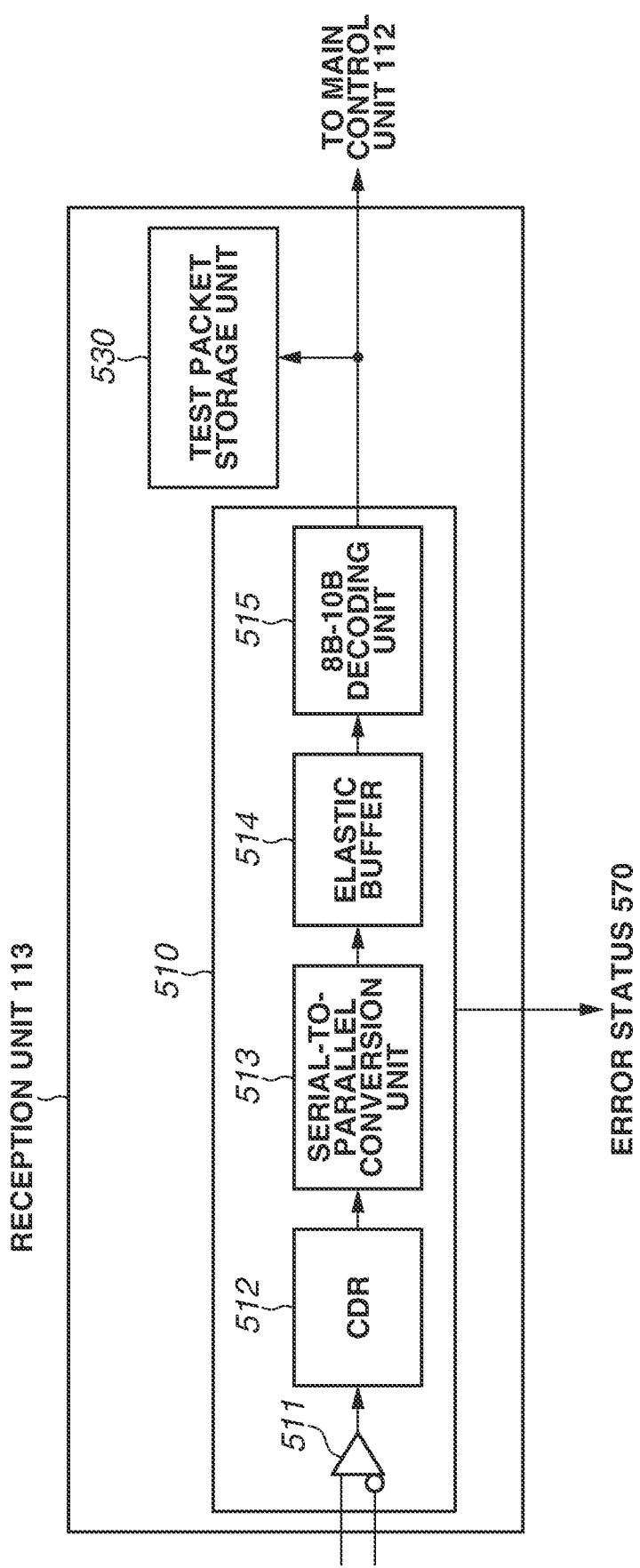

FIRST EXEMPLARY EMBODIMENT

SECOND EXEMPLARY EMBODIMENT

INFORMATION PROCESSING APPARATUS AND METHOD FOR CONTROLLING THE SAME

BACKGROUND OF THE INVENTION

Field of the Invention

The present invention relates to an information processing apparatus and a method for controlling the information processing apparatus.

Description of the Related Art

There has conventionally been proposed a system in which a plurality of data processing units is connected in a ring shape via a data bus. Data is transmitted in one direction of the ring-shaped data bus to enable data exchange between a plurality of the data processing units (refer to Japanese Patent Application Laid-Open No. 2010-245953).

In a conventional self-diagnostic method for a bus connected in a ring shape (self-diagnosis method for a data transmission line), a normal condition (OK) is determined when data transmitted from a main chip returns to the main chip via the ring-shaped bus, and an abnormal condition (NG) is determined when the data does not return to the main chip. However, the conventional method has an issue that, when an abnormal condition is determined, it is not possible to determine where in the ring-shaped bus a failure has occurred, i.e., to determine the failure location. The conventional method consumes time and requires much cost in failure location analysis, and therefore easy maintainability is not obtained.

SUMMARY OF THE INVENTION

The present invention is directed to providing a mechanism for making it possible to identify a failure location even if a failure occurs in a ring-shaped bus.

There is provided an information processing apparatus in which a plurality of modules including at least a first module and a second module is connected in a ring shape. The first module includes a first transmission unit configured to transmit predetermined data. The second module adjacent to the first module includes a second reception unit configured to receive the predetermined data transmitted by the first transmission unit, and a second transmission unit configured to transmit first attribute data including identification information for identifying a module when the predetermined data has not been received within a first predetermined time period.

Further features of the present invention will become apparent from the following description of exemplary embodiments with reference to the attached drawings.

BRIEF DESCRIPTION OF THE DRAWINGS

FIG. 5 is a block diagram illustrating details of a reception unit in the main chip.

DESCRIPTION OF THE EMBODIMENTS

Exemplary embodiments of the present invention will be described below with reference to the accompanying drawings.

Figure 1:
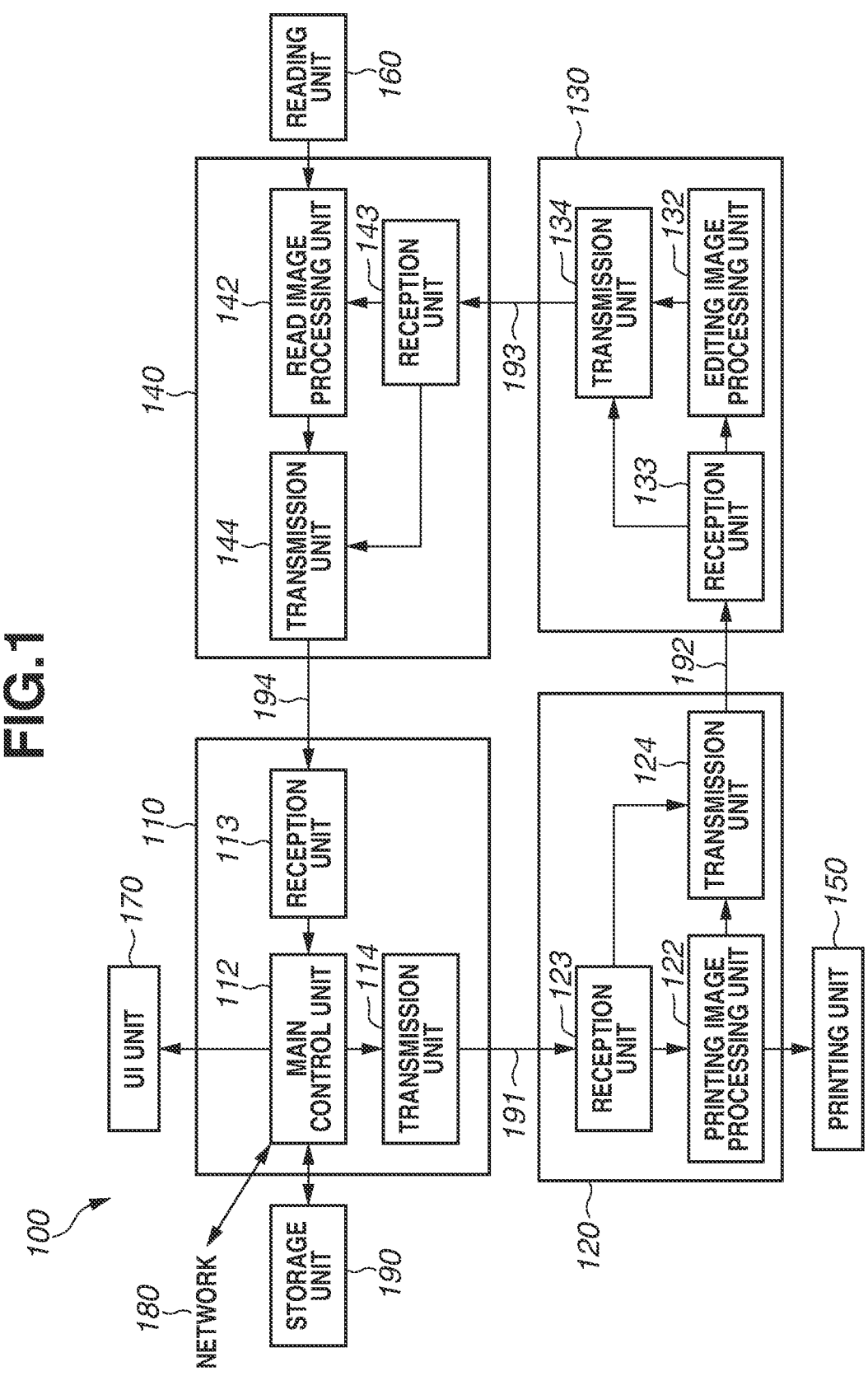
FIG. 1 is a block diagram illustrating a configuration of an image processing apparatus according to the present exemplary embodiment.

FIG. 1 is a block diagram illustrating a configuration of an image processing apparatus 100 to which an information processing apparatus according to a first exemplary embodiment of the present invention is applicable.

The image processing apparatus 100 according to the present exemplary embodiment includes a main chip 110 and sub chips 120, 130, and 140 connected in a ring shape by ring buses 191, 192, 193, and 194, and configured to perform data transmission in this order. The number of sub chips connected by the ring-shaped bus is not limited to three and may be one or more. More specifically, the main chip and one or more sub chips need to be connected in the ring-shaped bus to enable sequential data transmission.

Data is transmitted between the above-described chips in predetermined units, i.e., in units of a packet. The configuration of a packet will be described below with reference to FIG. 6A.

Figure 6A:
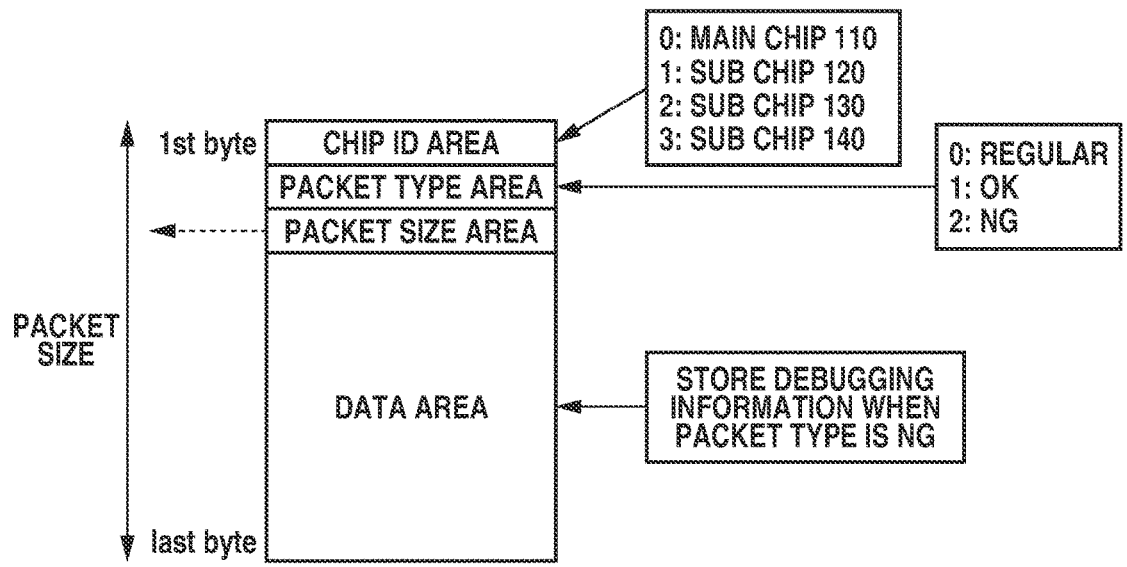
FIGS. 6A and 6B illustrate a packet configuration according to the present exemplary embodiment.

FIG. 6A illustrates a packet configuration according to the first exemplary embodiment.

According to the first exemplary embodiment, each packet is configured as illustrated in FIG. 6A. More specifically, each packet includes a chip identifier (ID) area, a packet type area, a packet size area, and a data area.

The chip ID area stores chip ID information that specifies the destination of the packet. The packet type area stores the packet type which explicitly indicates whether the packet is a packet (OK packet/NG packet) to be used in the ring bus self-diagnostic operation or a regular packet. The ring bus self-diagnostic operation refers to an operation in which the image processing apparatus 100 performs self-diagnosis on the data transmission line in the ring-shaped bus to detect a failure location in the ring-shaped bus (described in detail below).

The packet type is "0" for a regular packet, "1" for an OK packet (packet having the OK attribute), and "2" for an NG packet (packet having the NG attribute). The packet size area stores the packet size which indicates the size of the packet. The data area stores the data to be transmitted by the packet. When the packet type stored in the packet type area in the ring bus self-diagnostic operation (described below) is NG, debugging information is stored in the data area in an NG packet.

Description of FIG. 1 will be resumed.

Each of reception units 113, 123, 133, and 143 of the chips 110, 120, 130, and 140 refers to the chip ID of the packet. When the destination of the packet is itself, the reception unit of the chip transmits the packet to the internal block 112, 122, 132, or 142. On the other hand, when the destination of the packet is not itself, the chip transmits the packet as it is to the next (downstream) chip via the transmission unit 114, 124, 134, or 144 of the chip.

When any one of the chips 110, 120, 130, and 140 has data to be transmitted, the chip generates a packet containing the data and adds destination information (chip ID) to the packet to transmit data to any desired chip. More specifically, the chips 110, 120, 130, and 140 are configured to perform data transmission and reception with each other via the ring-shaped bus.

The main chip 110 receives a copying, printing, and reading command from the user via a user interface (UI) unit 170 or outputs a message to the user. The main chip 110 is also connected with a network 180 to receive print data from other host computers connected to the network.

The sub chip 120 performs, via the printing image processing unit 122, image processing (color conversion and binarization and the like,) suitable for a printing unit 150 on the image data transmitted from the main chip 110, and transmits the processed image data to the printing unit 150. Based on the image data, the printing unit 150 forms an image on a paper sheet, for example, by using the electrophotographic method.

The sub chip 130 performs, via the editing image processing unit 132, processing (rotation and reduction) on image data transmitted from the main chip 110, and transmits the processed image data to the main chip 110.

The sub chip 140 performs, via the read image processing unit 142, image processing for reading (color correction and filter processing) on image data transmitted from a reading unit 160, and transmits the processed image data to the main chip 110. The reading unit 160 optically scans an image such as a document and converts the image into digital data.

The image data transmitted from the sub chips 130 and 140 is stored in a storage unit 190 via the main chip 110.

In the image processing apparatus 100 configured as described above, the main chip 110 totally controls each component to achieve the copy, printing, and reading functions.

The main control unit 112 of the main chip 110 implements a configuration for achieving the ring bus self-diagnostic operation in the main chip 110 illustrated in the flowchart (described below). The main control unit 112 implements this configuration, for example, as a program and performs control illustrated in the flowcharts (described below).

The transmission unit and reception unit of each chip will be described below according to the data transmission sequence.

First, the transmission unit 114 in the main chip 110 will be described below.

Figure 2:
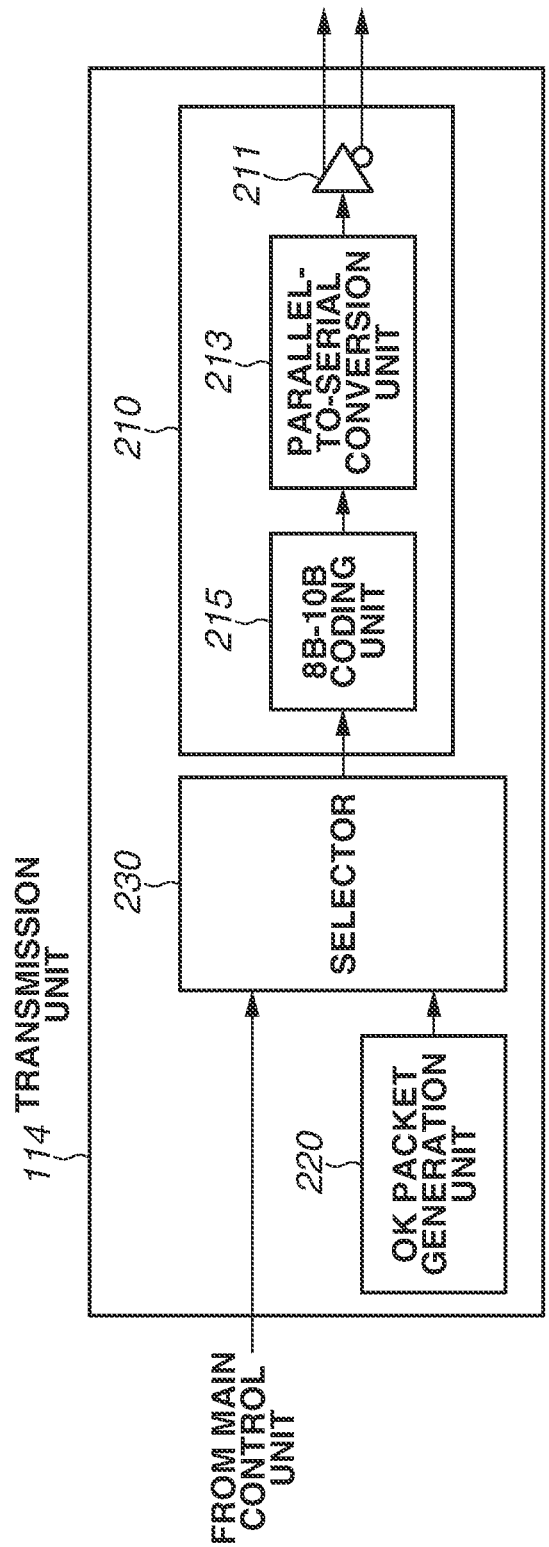
FIG. 2 is a block diagram illustrating details of a transmission unit in a main chip.

FIG. 2 is a block diagram illustrating details of the transmission unit 114 in the main chip 110. Although the present exemplary embodiment described below is based on a high-speed serial interface used for connection between chips, the configuration is not limited thereto.

In the transmission unit 114 illustrated in FIG. 2, a packet generation unit 220 is used to generate an OK packet. The OK packet is a packet output from the main chip 110 in the ring bus self-diagnostic operation which characterizes the present invention. The OK packet generation unit 220 sets the packet type "1" which indicates that the packet is an OK packet, to the packet type area of the OK packet. The OK packet is distinguished from an NG packet with this packet type. The OK packet generation unit 220 also sets the chip ID "0" of the main chip 110 to the chip ID area of the OK packet so that the OK packet returns to the main chip 110.

A selector 230 selects either the packet from the main control unit 112 or the OK packet and outputs the selected packet. A transmission PHY 210 converts the packet selected by the selector 230 into serial data and outputs the serial data at high frequency. According to the present exemplary embodiment, a packet is input to the transmission PHY 210 in units of 8 bits. An 8B-10B coding unit 215 in the transmission PHY 210 converts 8 bits into bits based on a predetermined rule. A parallel-to-serial conversion unit 213 converts the 10-bit data converted by the 8B-10B coding unit 215 into serial data. A differential driver 211 differentially outputs the serial data converted by the parallel-to-serial conversion unit 213. The 8B-10B coding unit 215 guarantees that the High and Low levels of the serial data are uniform and that one level does not last for a prolonged time period. This enables a Clock Data Recovery (CDR) 312 in a reception PHY 310 of the reception unit 123 illustrated in FIG. 3 (described below) to restore a clock.

The differential signal output from the transmission unit 114 within the main chip 110 is received by the reception unit 123 within the sub chip 120.

The reception unit 123 within the sub chip 120 will be described below.

Figure 3:
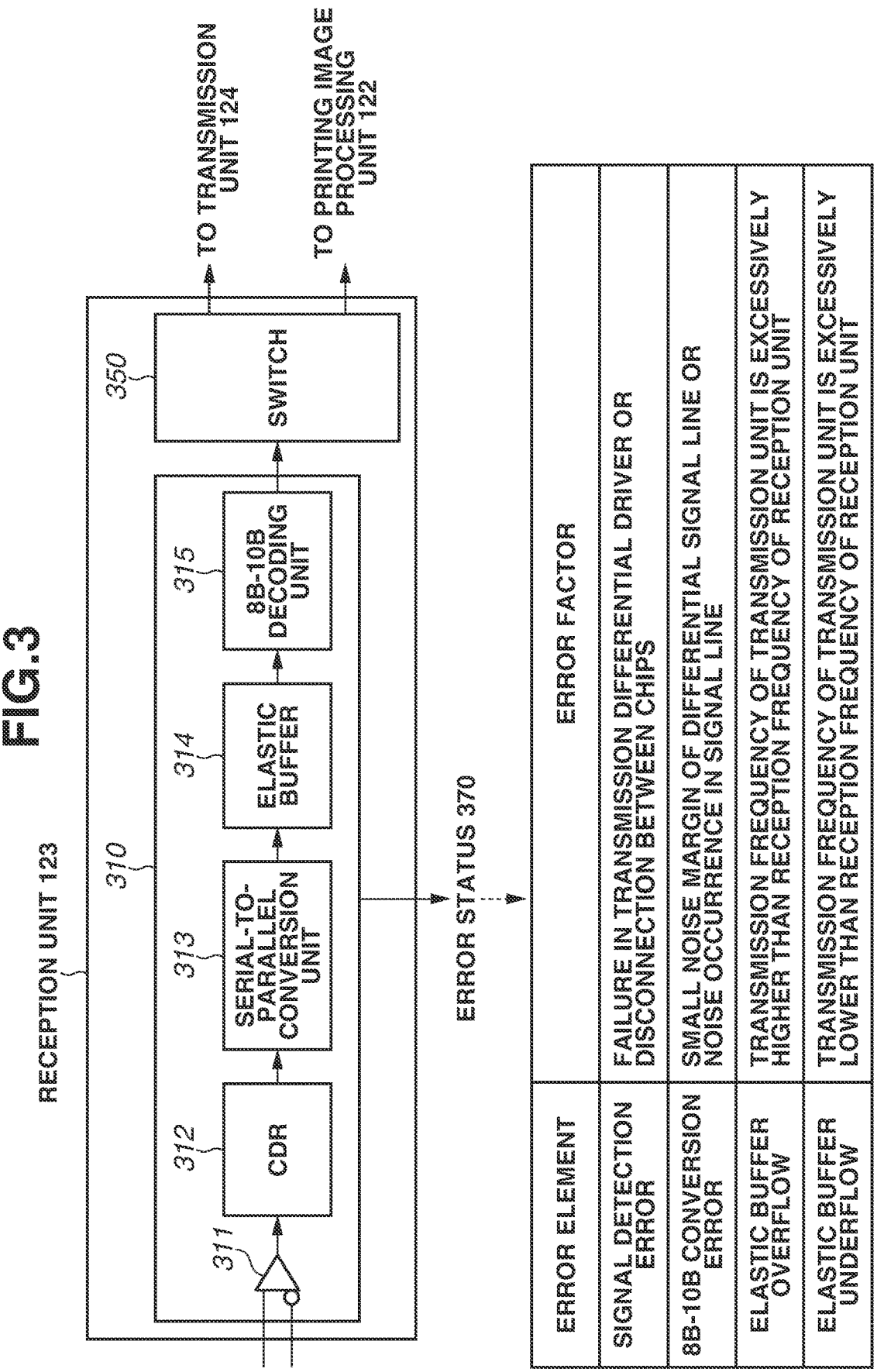
FIG. 3 is a block diagram illustrating details of a reception unit in a sub chip.

FIG. 3 is a block diagram illustrating details of the reception unit 123 within the sub chip 120. The reception unit 123 has a configuration similar to the reception unit 133 within the sub chip 130 and the reception unit 143 within the sub chip 140.

The reception PHY 310 receives a differential signal transmitted from the transmission unit of the upstream chip and restores the packet. A differential receiver 311 within the reception PHY 310 receives the differential signal. The CDR 312 restores the clock from the differential signal received by the differential receiver 311 and outputs serial data to the serial-to-parallel conversion unit 313. The serial-to-parallel conversion unit 313 converts the serial data output from the CDR 312 and outputs parallel data to the elastic buffer 314. The parallel data passes through an elastic buffer 314 for absorbing the frequency difference between the transmission unit 124 and the reception unit 123, and is decoded from 10-bit data into 8-bit data by an 8B-10B decoding unit 315. As described above, the packet input to the transmission PHY 210 in the transmission unit 114 of the main chip 110 is restored as the output of the reception PHY 310 of the sub chip 120.

The PHY 310 constantly outputs an error status 370. Error status elements (error elements) will be described below.

A "signal detection error" indicates that a differential receiver (for example, the differential receiver 311) cannot detect the level difference of the differential signal, i.e., a failure in a differential driver (for example, the differential driver 211) or a disconnection between chips (for example, a disconnection on the ring bus 191) is assumed. An "8B-10B decoding error" indicates that a signal train (symbols) other than the predetermined 10-bit data has been received. It can be thought that a transmission error has occurred because of a small noise margin of the differential signal line between the chips or noise added on a signal line.

An "elastic buffer overflow" indicates that the elastic buffer has overflowed because the transmission frequency of the transmission unit is excessively higher than the reception frequency of the reception unit.

An "elastic buffer underflow" indicates that the elastic buffer has underflowed because the transmission frequency of the transmission unit is excessively lower than the reception frequency of the reception unit, resulting in an interruption of reception data.

For example, in a state where there is no error corresponding to the above-described error elements, the error status 370 is information (for example, a bit sequence "0000") corresponding to a signal detection error: (not detected), an 8B-10B decoding error: 0 (not detected), an elastic buffer overflow: 0 (not detected), and an elastic buffer underflow: 0 (not detected). In a state where there is only a signal detection error, the error status 370 is information (for example, a bit sequence "1000") corresponding to a signal detection error: 1 (detected), an 8B-10B decoding error: 0 (not detected), an elastic buffer overflow: 0 (not detected), and an elastic buffer underflow: 0 (not detected).

The switch 350 switches the destination of the packet output from the reception PHY 310 between the printing image processing unit 122 and the transmission unit 124 based on the chip ID of the packet. More specifically, when the chip ID of the packet is "1", the switch 360 selects the printing image processing unit 122 as the destination of the packet. When the chip ID is not "1", the switch 360 selects the transmission unit 124 as the destination of the packet. At the time of the ring bus self-diagnostic operation, since the chip ID of both the OK and NG packets is "0", the destination is the main chip 110 and therefore the packet is transmitted to the transmission unit 124.

The transmission unit 124 within the sub chip 120 will be described below.

Figure 4:
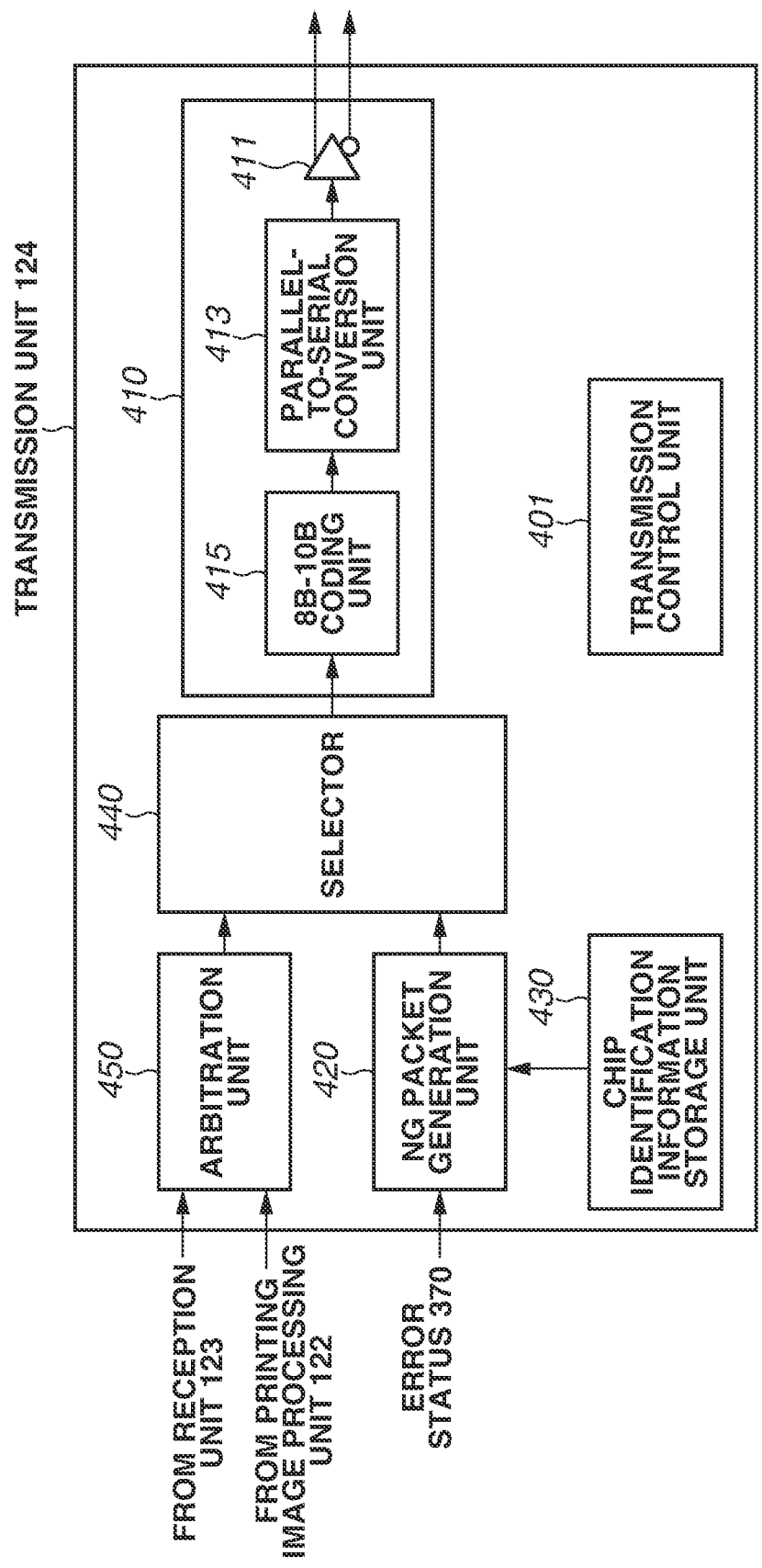
FIG. 4 is a block diagram illustrating details of a transmission unit in a sub chip according to a first exemplary embodiment.

FIG. 4 is a block diagram illustrating details of the transmission unit 124 within the sub chip 120. The transmission unit 124 has a configuration similar to the transmission unit 134 within the sub chip 130 and the transmission unit 144 within the sub chip 140.

The NG packet generation unit 420 is operated to generate an NG packet. The NG packet generation unit 420 generates the NG packet based on the error status 370 output by the reception unit 123 and the chip identification information output by a chip identification information storage unit 430. The NG packet generation unit 420 sets in the packet type area of the NG packet the packet type "2" which indicates that the packet is the NG packet. The NG packet is distinguished from an OK packet with this packet type.

An arbitration unit 450 performs arbitration to determine whether a packet is to be received from the reception unit 123 or from the printing image processing unit 122. The selector 440 selects either a packet from the arbitration unit 450 or the NG packet and outputs the selected packet.

The transmission control unit 401 implements a configuration for performing the ring bus self-diagnostic operation in the sub chip illustrated in the flowchart (described below). The transmission control unit 401 implements this configuration, for example, as a program and performs control illustrated in the flowcharts described below.

A transmission PHY 410 has a configuration similar to the transmission PHY 210 illustrated in FIG. 2, therefore, redundant descriptions thereof will be omitted.

The output from the transmission unit 124 within the sub chip 120 is received by the reception unit 133 within the sub chip 130. The output from the transmission unit 134 within the sub chip 130 is received by the reception unit 143 within the sub chip 140. The output from the transmission unit 144 within the sub chip 140 is received by the reception unit 113 within the main chip 110.

Finally, the reception unit 113 within the main chip 110 will be described below.

FIG. 5 is a block diagram illustrating details of the reception unit 113 within the main chip 110.

A reception PHY 510 has a configuration similar to the reception PHY 310, and redundant descriptions thereof will be omitted. An error status 570 is transmitted to the main control unit 112.

A packet output from the reception PHY 510 is transmitted to the main control unit 112. Both the OK and NG packets are stored in the test packet storage unit 530.

The ring bus self-diagnostic operation in the above-described configuration will be described below.

Processing illustrated in the following flowcharts is started when the image processing apparatus 100 is supplied with power and a system start signal (not illustrated) is transmitted to each chip (at a predetermined timing indicated by time t0 illustrated in FIGS. 9A, 9B, 10A, and 10B). The processing is not performed at the same time as regular operations such as the copy, print, and read operations. The ring bus self-diagnostic operation is performed when the main chip 110 and the sub chips 120, 130, and 140 perform their own control processing. For example, the main chip 110 performs the ring bus self-diagnostic operation by executing the control illustrated in FIG. 8. The sub chip 120 performs the ring bus self-diagnostic operation by executing the control illustrated in FIG. 7A. The sub chip 130 performs the ring bus self-diagnostic operation by executing the control illustrated in FIG. 7B. The sub chip 140 performs the ring bus self-diagnostic operation by executing control (not illustrated) similar to the control illustrated in FIG. 7B.

The ring bus self-diagnostic operation will be described below.

Input and output waveforms of the four chips when the NG packet is generated and when the NG packet is not generated in the ring bus self-diagnostic operation will be described below with reference to FIGS. 9A, 9B, 10A, and 10B.

Figure 9:
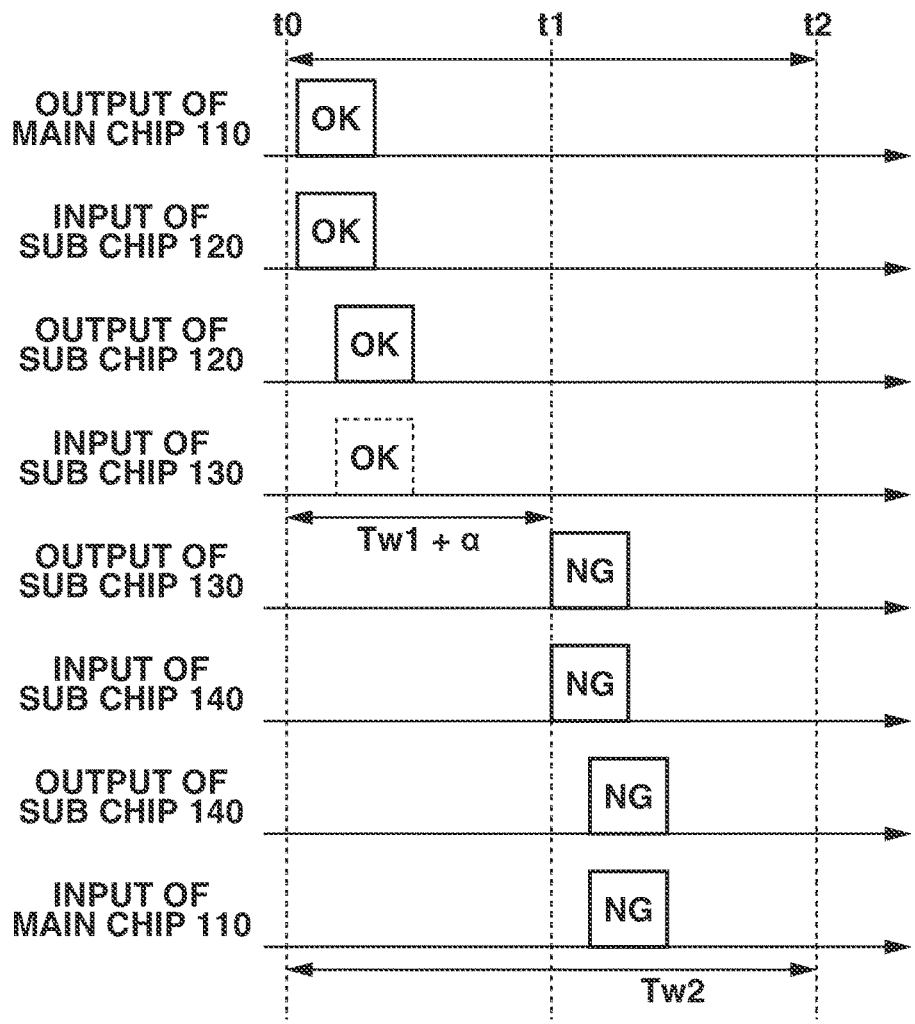
FIGS. 9A and 9B illustrate input and output waveforms of each chip when an NG packet is generated in a ring bus self-diagnostic operation.

Input and output waveforms of the four chips when the NG packet is generated in the ring bus self-diagnostic operation is illustrated in FIG. 9A. A packet (NG packet) received by the main chip 110 is illustrated in FIG. 9B.

Figure 10:
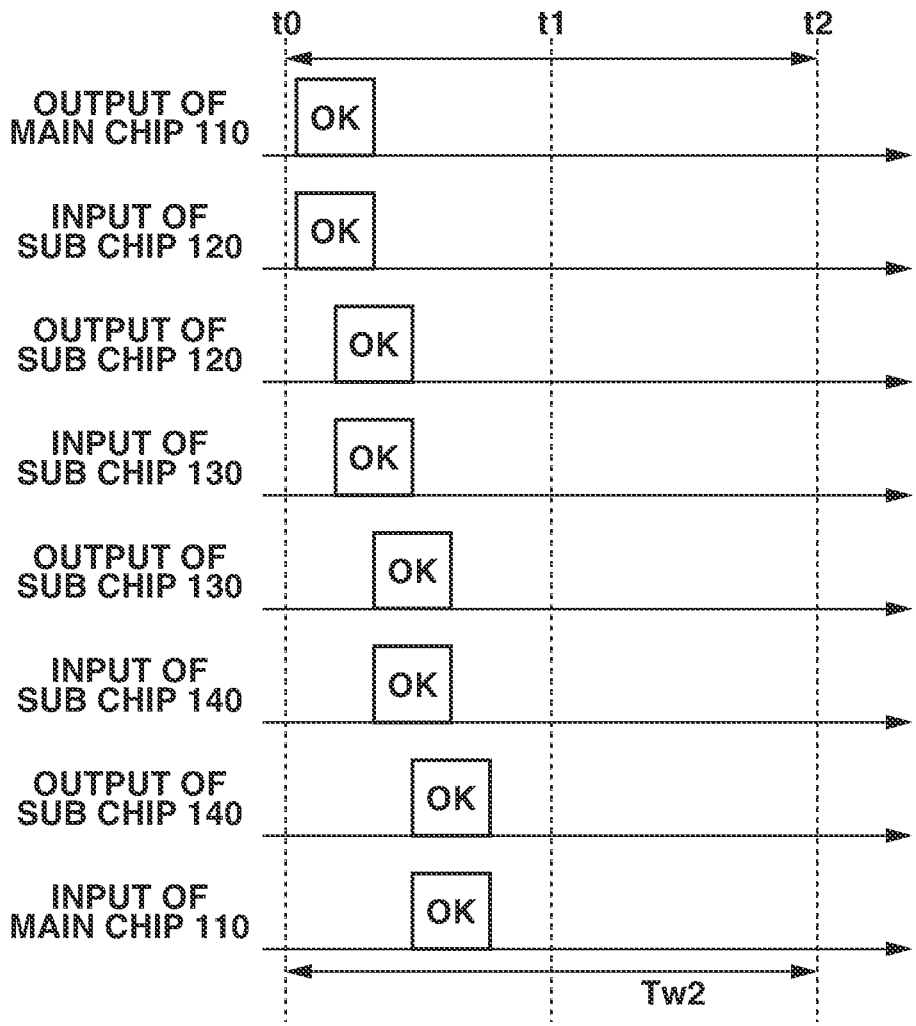
FIGS. 10A and 10B illustrate input and output waveforms of each chip when an NG packet is not generated in the ring bus self-diagnostic operation.

Input and output waveforms of the four chips when the NG packet is not generated in the ring bus self-diagnostic operation is illustrated in FIG. 10A. A packet (OK packet) received by the main chip 110 is illustrated in FIG. 10B.

Operations of the four chips will be described below with reference to FIGS. 7A, 7B, and 8.

[Control by Sub Chip 120]

Figure 7A:
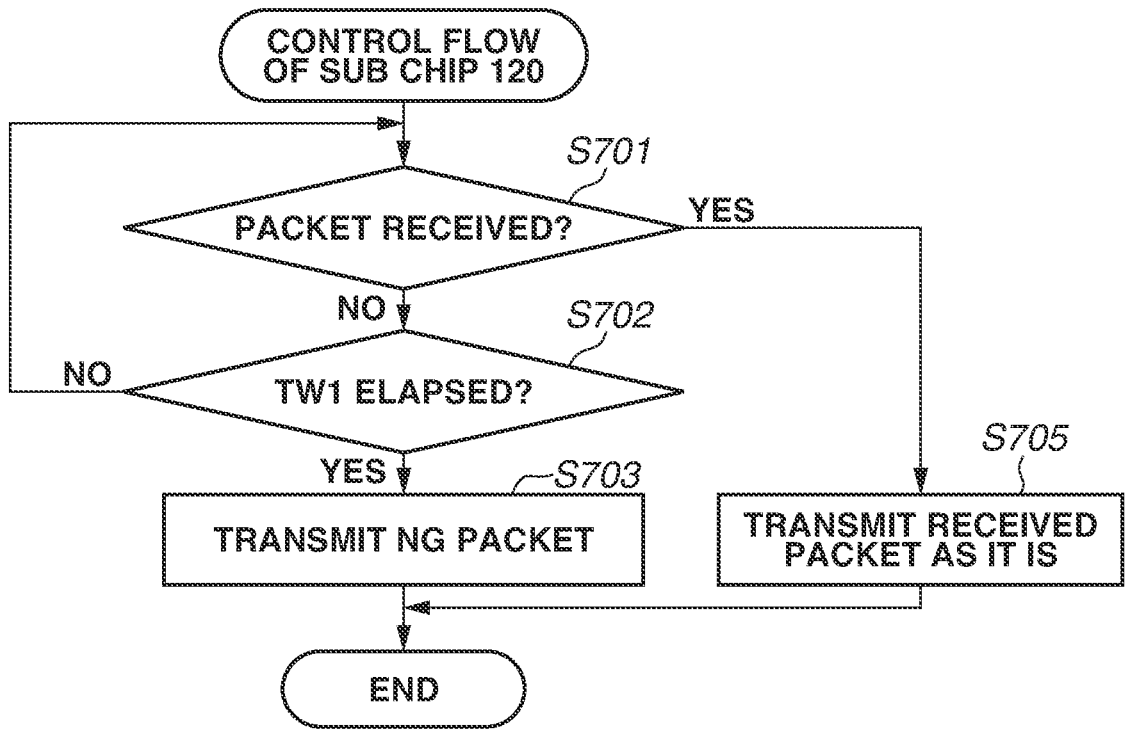
FIGS. 7A and 7B are flowcharts illustrating control processing of the sub chip according to the first exemplary embodiment.

FIG. 7A is a flowchart illustrating control processing of the sub chip 120. Processing of this flowchart is performed under the control of the transmission control unit 401 of the sub chip 120.

When the processing of this flowchart is started (at time t0 illustrated in FIGS. 9A, 9B, 10A, and 10B), in step S701, the transmission control unit 401 determines whether a received packet is transmitted from the reception unit 123. When the transmission control unit 401 determines that a received packet has not been transmitted (NO in step S701), the processing proceeds to step S702. In step S702, the transmission control unit 401 determines whether a time period Tw1 has elapsed from when this processing has started. When the transmission control unit 401 determines that the time period Tw1 has not elapsed (NO in step S702), the processing returns to step S701. More specifically, after starting this processing, in steps S701 and S702, the transmission control unit 401 waits (monitors the processing) for the time period Tw1 until a received packet is transmitted from the reception unit 123. The predetermined time period Tw1 is preset to the sub chip 120 as a sufficient wait time for the sub chip 120 to complete the reception of the OK or NG packet.

When the transmission control unit 401 determines that a received packet has not been transmitted from the reception unit 123 even after the time period Tw1 has elapsed (NO in step S701 and YES in step S702), the processing proceeds to step S703. In step S703, the transmission control unit 401 controls the NG packet generation unit 420 to generate the NG packet including the error status 370 and the chip identification information output from the chip identification information storage unit 430. In this case, the transmission control unit 401 controls the selector 440 to constantly select the output of the NG packet generation unit 420. As a result, the sub chip 120 outputs an NG packet.

On the other hand, when the transmission control unit 401 determines that a received packet has been transmitted from the reception unit 123 before the time period Tw1 has elapsed (YES in step S701), the processing proceeds to step S705. In step S705, the transmission control unit 401 controls the transmission PHY 410 to output the received packet as it is. More specifically, in this case, the transmission control unit 401 controls the selector 440 to select the output of the arbitration unit 450 (received packet). As a result, the sub chip 120 outputs the received packet as it is.

[Control by Sub Chip 130]

Figure 7B:
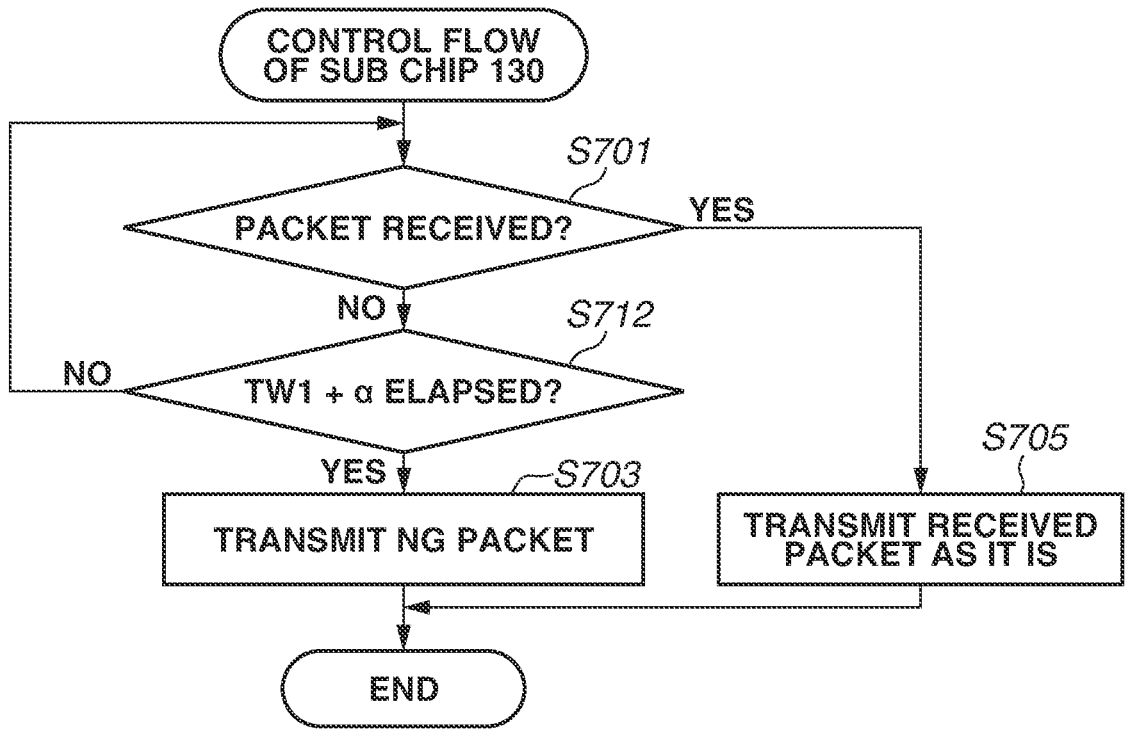

FIG. 7B is a flowchart illustrating control processing of the sub chip 130. Steps identical to those in FIG. 7A are assigned the same step numbers. Processing of this flowchart is performed under the control of the transmission control unit 401 of the sub chip 130.

The difference between the control by the sub chip 130 (FIG. 7B) and the control by the sub chip 120 (FIG. 7A) is only the wait time in step S712. More specifically, in step S712, the sub chip 130 waits for a packet reception for a time period "Tw1+α", while in step S702, the sub chip 120 waits for a packet reception for the time period "Tw1". This is because, when the sub chip 120 outputs the NG packet at a time "t0+Tw1", the sub chip 130 further requires a packet transmission time period (α) to detect the packet. The predetermined time period Tw1+α is previously set to the sub chip 130 as a sufficient wait time for the sub chip 130 to complete the reception of the OK or NG packet.

The processing in step S705 executed after the transmission control unit 401 determines that the received packet is present in step S701, is processing in common with the control by the sub chip 120.

[Control by Sub Chip 140]

Similarly, the control by the sub chip 140 differs from the control by the sub chip 120 only in the wait time. Therefore, a flowchart illustrating the control by the sub chip 140 will be omitted. Since the sub chip 140 needs to wait for an additional time period α compared with the sub chip 130 for the above-described reason, therefore, needs to monitor packet reception for a time period Tw1+2α from time t0. More specifically, when the control is performed by the sub chip 140, "Tw1+α" in step S712 illustrated in FIG. 7B is replaced with "Tw1+2α". The predetermined time period Tw1+2α is preset to the sub chip 140 as a sufficient wait time for the sub chip 140 to complete the reception of the OK or NG packet.

More specifically, when a packet is received from the bus within a wait time starting from when power is turned ON which is predetermined for each sub chip, each sub chip outputs the received packet to the bus. On the other hand, when no packet is received from the bus within the wait time, each sub chip generates the NG packet and outputs it to the bus.

[Control by Main Chip 110]

Figure 8:
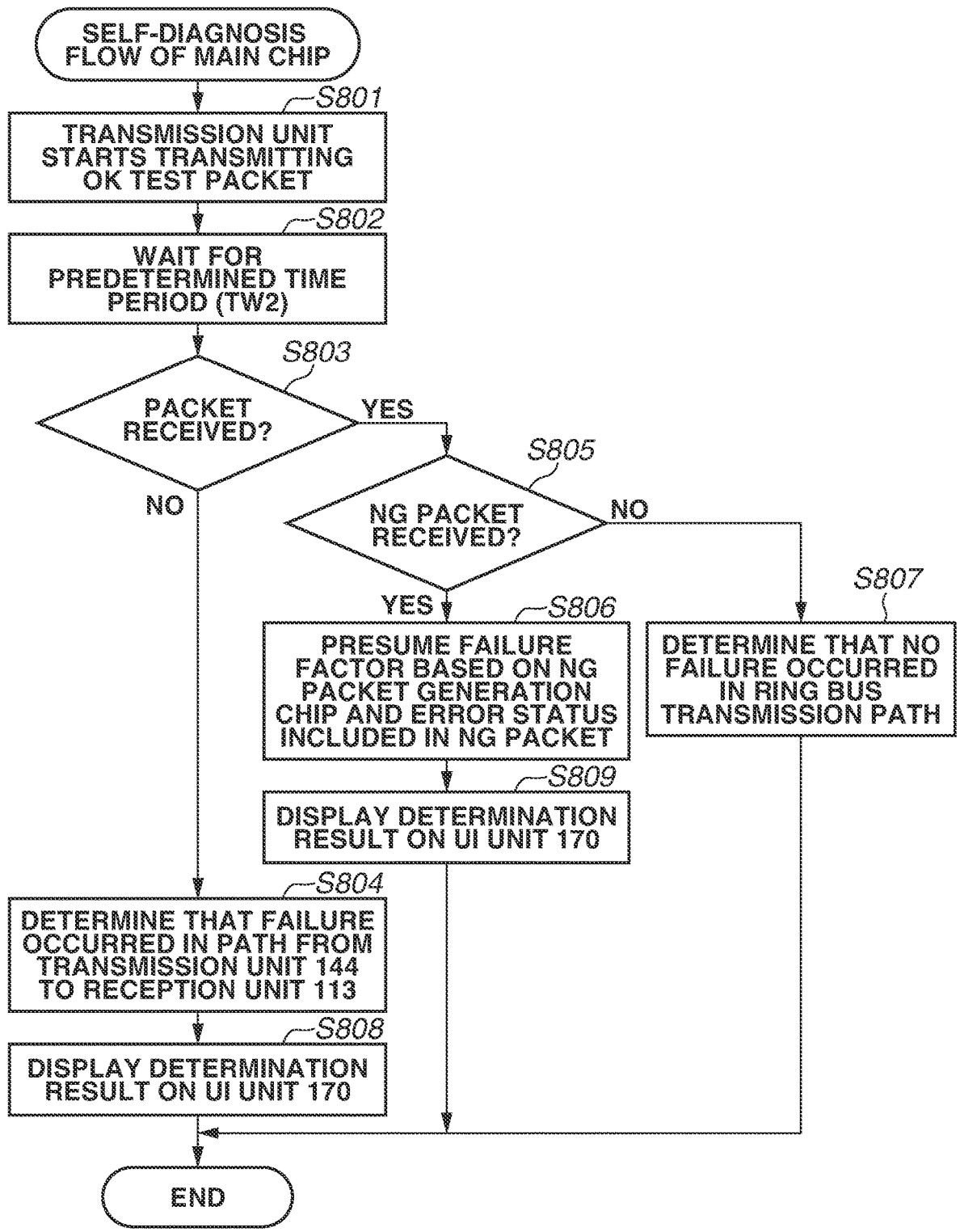
FIG. 8 is a flowchart illustrating control processing of the main chip according to the first exemplary embodiment.

FIG. 8 is a flowchart illustrating control processing of the main chip 110. Processing of this flowchart is performed under the control of the main control unit 112 of the main chip 110.

When processing of this flowchart is started (at time t0 illustrated in FIGS. 9A, 9B, 10A, and 10B), in step S801, the main control unit 112 controls the OK packet generation unit 220 to generate and output the OK packet. In this case, the main control unit 112 controls the selector 230 to constantly select the output of the OK packet generation unit 220. As a result, the main chip 110 outputs one OK packet.

In step S802, the main control unit 112 waits for a predetermined time period Tw2. The predetermined time period Tw2 is preset to the main control unit 112 as a sufficient wait time for the main control unit 112 to complete the reception of the OK or NG packet when returning the packet to the main chip 110. When the reception unit 113 of the main chip 110 receives a packet during the wait time in step S802, the reception unit 113 stores the packet in a test packet storage unit 530.

After waiting for the time period Tw2 (at time t2), in step S803, the main control unit 112 checks the test packet storage unit 530 to determine whether a packet has been received in the above-mentioned wait time. When the transmission control unit 401 determines that no packet has been received (NO in step S803), the processing proceeds to step S804.

In step S804, the main control unit 112 determines that a failure has occurred in the path from the transmission unit 144 of the sub chip 140 to the reception unit 113 of the main chip 110. The main control unit 112 presumes the error factor based on the error status 570 output by the reception unit 113. The error factor is described above with reference to FIG. 3. For example, in the case of signal detection error: 1 (detected), the main control unit 112 presumes a failure in the differential driver 411 of the sub chip 140 or a disconnection of the ring bus 194.

In step S808, the main control unit 112 displays the determination result in step S804 and the error factor presumption result on the UI unit 170, and the processing exits this flowchart.

On the other hand, when the transmission control unit 401 determines that a packet has been received (YES in step S803), the processing proceeds to step S805.

In step S805, the main control unit 112 checks the packet (test packet) stored in the test packet storage unit 530 to determine whether the test packet is the NG packet. When the transmission control unit 401 determines that the test packet is the NG packet (YES in step S805), the processing proceeds to step S806.

In step S806, the main control unit 112 determines that a failure has occurred in the ring bus transmission path and presumes the failure location and error factor based on the NG packet generation chip information and the error status information included in the received NG packet (status information of the NG packet generation source sub chip).

A specific example of the presumption of the failure location and error factor will be described below.

For example, a disconnection failure which occurs in the ring bus 192 will be described below. Input and output waveforms of the four chips in this case are illustrated in FIG. 9A. In this case, the sub chip 130 does not receive a packet and therefore transmits the NG packet (time t1) under the control of the sub chip illustrated in FIG. 7B. The following sub chip 140 transmits the received NG packet to the ring bus in the subsequent stage under the control of the above-described sub chip. As a result, the NG packet is stored in the test packet storage unit 530 of the main chip 110. An example of the NG packet stored in the test packet storage unit 530 is illustrated in FIG. 9B. The main control unit 112 detects that the packet type is "2 (NG)" and that the NG packet has been generated by the sub chip 130 based on the NG packet generation source chip information ("2" in the example illustrated in FIG. 9B). The main control unit 112 further detects that a signal detection error has occurred based on the error status information "signal detection error: 1 (detected)". Then, the main control unit 112 presumes a failure in the differential driver 411 of the sub chip 120 or a disconnection of the ring bus 192 as an error factor.

In step S809, the main control unit 112 displays the determination result in step S806 and the presumption result on the UI unit 170, and the processing exits this flowchart.

On the other hand, when the transmission control unit 401 determines that the test packet stored in the test packet storage unit 530 is not the NG packet (NO in step S805), the main control unit 112 determines the test packet as an OK packet. Then, the processing proceeds to step S807.

In step S807, the main control unit 112 determines that no failure has occurred in the ring bus transmission path. A case where no failure has occurred will be described below with reference to a specific example.

If the main control unit 112 receives the OK packet, the OK packet should have passed through the sub chips 120, 130, and 140, as illustrated in FIG. 10A. Therefore, the main control unit 112 determines that no failure has occurred in the ring bus transmission path. The OK packet stored in the test packet storage unit 530 is illustrated in FIG. 10B.

After the main control unit 112 performs the processing in step S807, the processing exits this flowchart.

More specifically, when power is turned ON, the main chip 110 outputs the OK packet to the bus. Then, based on whether data has been received from the bus within the time period Tw2, and based on the NG packet generation source chip ID and the status information included in the NG packet received from the bus within the time period Tw2, the main chip 110 determines the failure location in the ring-shaped bus and presumes the failure factor.

As described above, even if a failure occurs in the ring-shaped bus, the image processing apparatus 100 according to the first exemplary embodiment can automatically detect the failure location and autonomously presume the failure factor at the timing that power is turned ON. As a result, the maintainability of the image processing apparatus 100 can be improved.

The execution timing of the ring bus self-diagnostic operation is not limited to the timing that power of the image processing apparatus 100 is turned ON. The ring bus self-diagnostic operation can also be executed based on an operation performed on the UI unit 170 and an instruction from an external apparatus such as a personal computer (PC) connected via the network 180. In this case, the determination and presumption results are displayed on the instruction source (such as the UI unit 170 and PC). This configuration enables detecting the failure location and error factor based on a user instruction also in a case where a failure occurs in the ring-shaped bus. As a result, the maintainability of the image processing apparatus 100 can be improved.

Also after the processing in step S807, i.e., also in a case where the main control unit 112 determines that no failure has occurred in the ring bus transmission path, the main control unit 112 may output the determination result in step S807 to the UI unit 170. For example, when the ring bus self-diagnostic operation is instructed from the UI unit 170, the determination result in step S807 may also be displayed on the UI unit 170. When the ring bus self-diagnostic operation is instructed from the PC via the network 180, the determination result in step S804, S806, or S807 may be notified to the instruction source (PC) via the network 180.

A second exemplary embodiment will be described below. The first exemplary embodiment has been described with respect to a configuration in which the transmission unit of each sub chip includes the chip identification information storage unit 430 and generates an NG packet with which the NG packet generation source chip can be identified, based on the chip identification information output by the chip identification information storage unit 430. The second exemplary embodiment will be described below with respect to the ring bus self-diagnostic operation which enables identifying the NG packet generation source chip even in the image processing apparatus 100 in which a sub chip including the transmission unit provided with no chip identification information storage unit 430 is connected to the main chip 110 via the ring-shaped bus. The processing for presuming the failure factor based on the error statuses 370 and 570 is similar to the first exemplary embodiment, and descriptions thereof will be omitted.

Figure 6B:
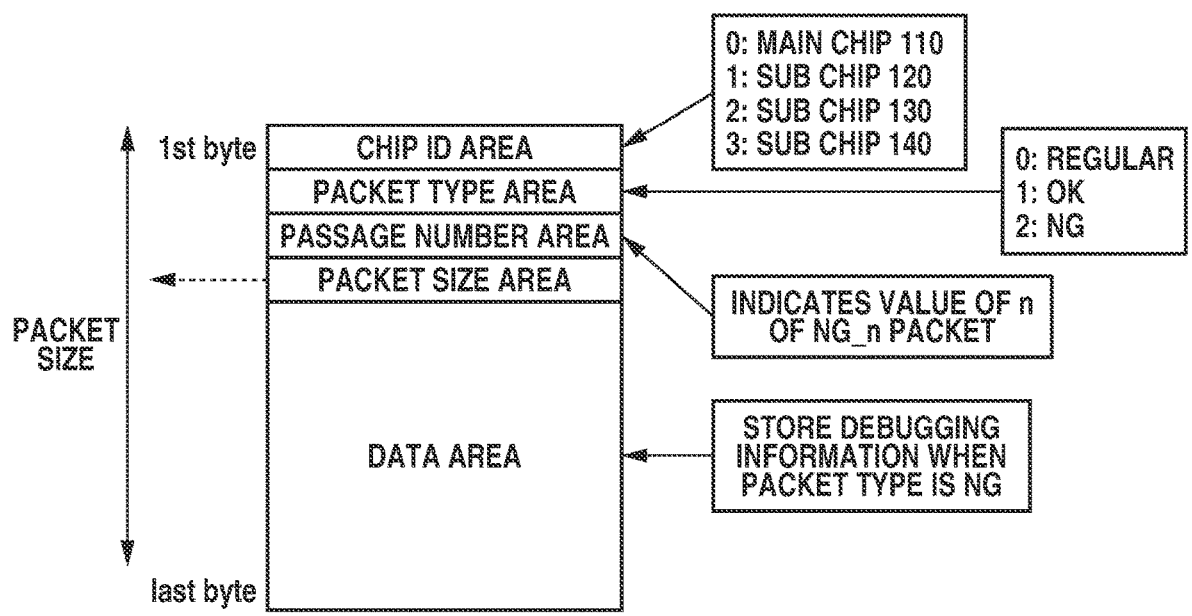
Figure 11:
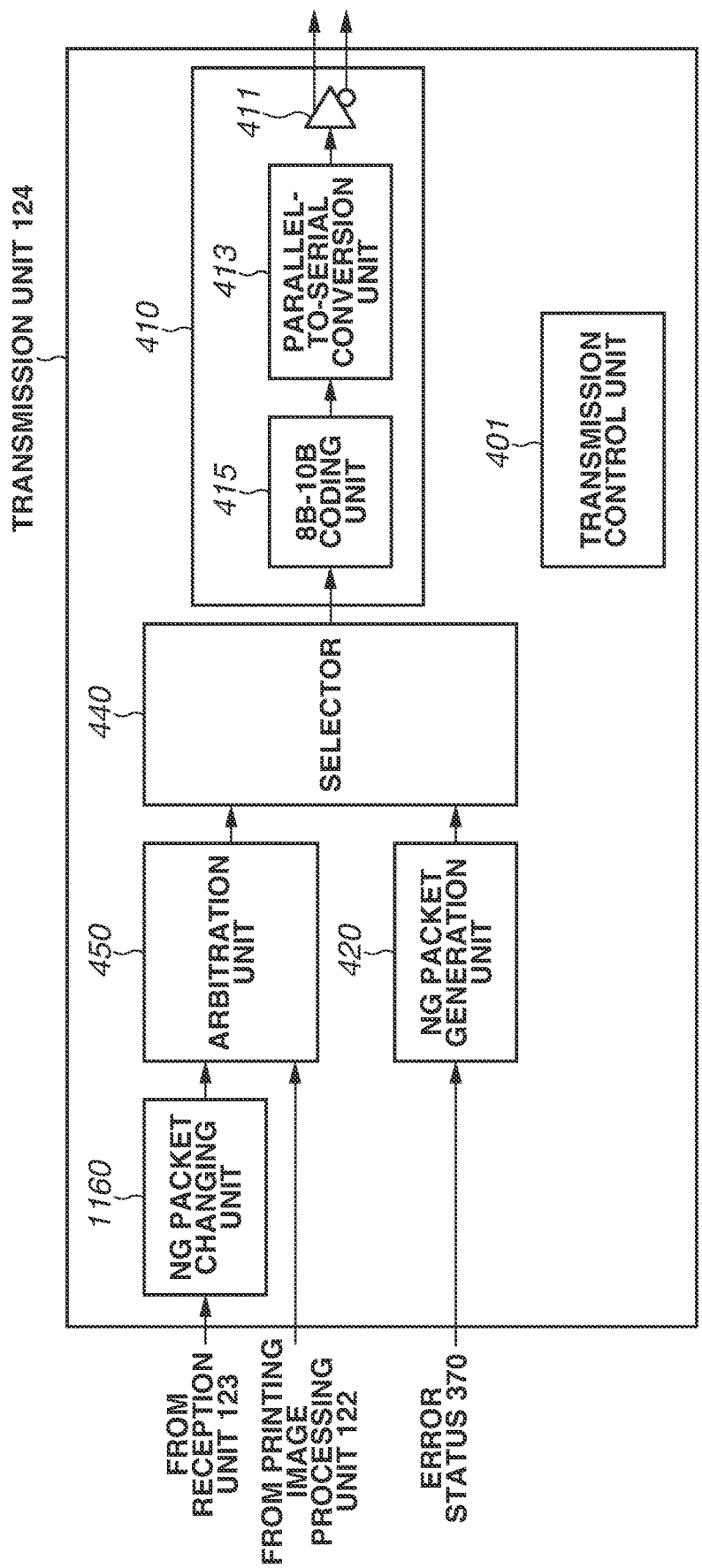
FIG. 11 illustrates details of the transmission unit in the sub chip according to a second exemplary embodiment.

FIG. 11 is a block diagram illustrating details of the transmission unit 124 in the sub chip 120 according to the second exemplary embodiment. The transmission unit 124 has a configuration similar to the transmission unit 134 in the sub chip 130 and the transmission unit 144 in the sub chip 140. The transmission unit 124 according to the second exemplary embodiment illustrated in FIG. 11 is different from the transmission unit 124 according to the first exemplary embodiment illustrated in FIG. 4 in that it does not include the chip identification information storage unit 430 and but includes an NG packet change unit 1160. The NG packet generation unit 420 according to the second exemplary embodiment is different from the NG packet generation unit 420 according to the first exemplary embodiment in that it generates an NG packet having the packet passage number "0" (NG_0 packet). The packet passage number is stored in the passage number area of a test packet as illustrated in FIG. 6B (described below). A packet having the passage number area "n" is referred to as an "NG_n packet".

When an NG packet is input as a received packet, the NG packet change unit 1160 increments the packet passage number by one. When a packet other than the NG packet is input, the NG packet change unit 1160 outputs the packet as it is.

A test packet configuration according to the second exemplary embodiment will be described below with reference to FIG. 6B.

FIG. 6B illustrates a test packet configuration according to the second exemplary embodiment.

As illustrated in FIG. 6B, the test packet according to the second exemplary embodiment has the passage number area for storing information indicating the passage number of the packet.

Similar to the ring bus self-diagnostic operation according to the first exemplary embodiment, the ring bus self-diagnostic operation according to the second exemplary embodiment is performed when the main chip 110 and the sub chips 120, 130, and 140 perform their own control processing. The ring bus self-diagnostic operation according to the second exemplary embodiment is implemented when the main chip 110 performs control illustrated in FIG. 13, the sub chip 120 performs control illustrated in FIG. 12, and the sub chips 130 and 140 perform control (not illustrated) similar to the control illustrated in FIG. 12.

The ring bus self-diagnostic operation according to the second exemplary embodiment will be described below.

[Control by Sub Chip 120]

Figure 12:
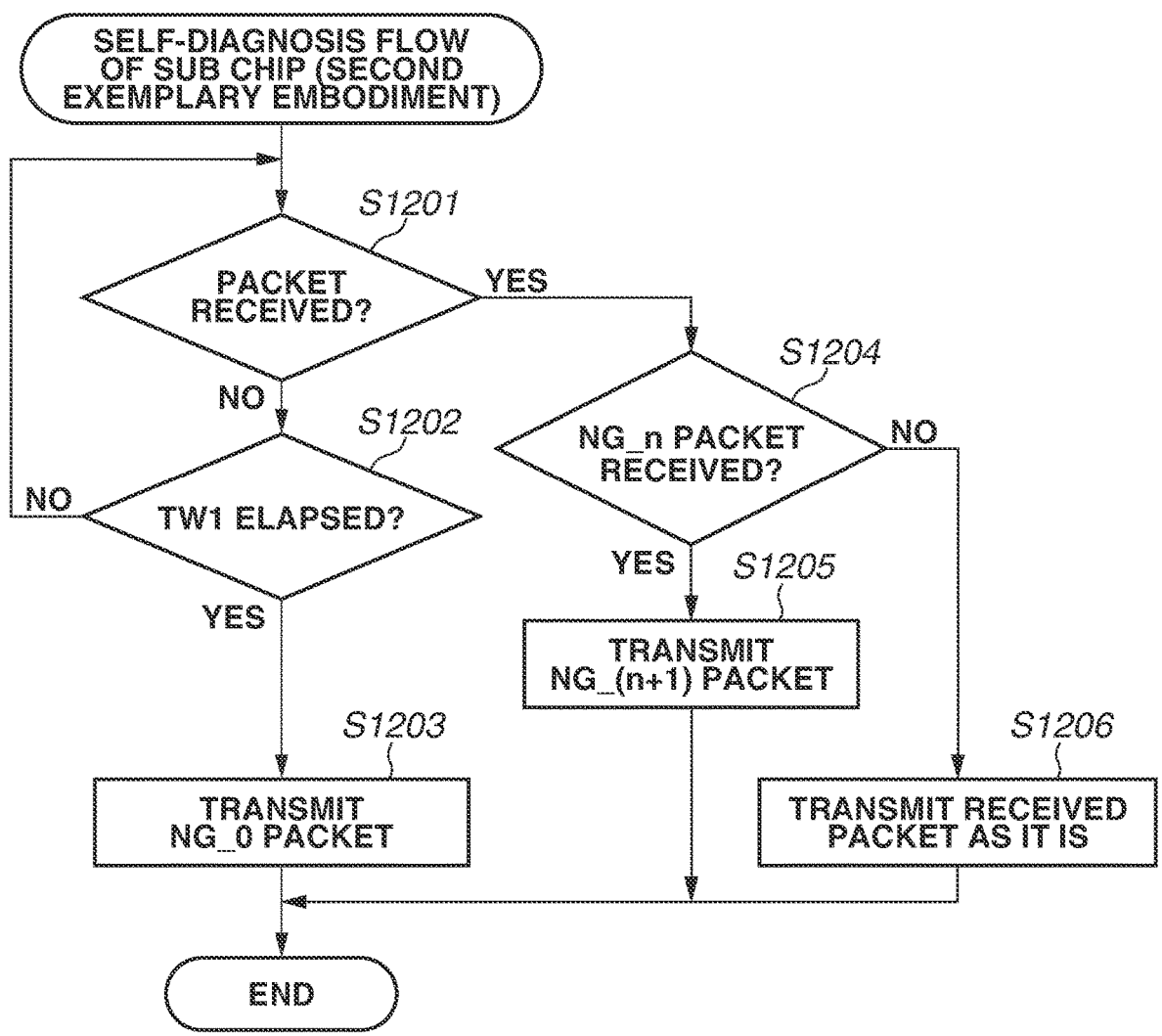
FIG. 12 is a flowchart illustrating control processing of the sub chip according to the second exemplary embodiment.

FIG. 12 is a flowchart illustrating control processing of the sub chip 120 according to the second exemplary embodiment as an example. Processing of this flowchart is performed under the control of the transmission control unit 401 of the sub chip 120.

Processing in steps S1201 and S1202 is similar to the processing in steps S701 and S702 illustrated in FIGS. 7A and 7B and redundant descriptions thereof will be omitted. However, when the transmission control unit 401 determines that a received packet has not yet been transmitted from the reception unit 123 after the time period Tw1 has elapsed (NO in step S1201 and YES in step S1202), the processing proceeds to step S1203. In step S1203, the transmission control unit 401 controls the NG packet generation unit 420 to generate an NG_0 packet including the error status 370. In this case, the transmission control unit 401 controls the selector 440 to constantly select the output of NG packet generation unit 420. As a result, the sub chip 120 outputs the NG_0 packet.

When the transmission control unit 401 determines that a received packet has been transmitted from the reception unit 123 before the time period Tw1 has elapsed (YES in step S1201), the processing proceeds to step S1204.

In step S1204, the transmission control unit 401 checks the packet type of the above-described received packet to determine whether the received packet is an NG_n packet. When the transmission control unit 401 determines that the received packet is the NG_n packet (YES in step S1204), the processing proceeds to step S1205.

In step S1205, the transmission control unit 401 controls the NG packet change unit 1160 to increment the value in the passage number area of the packet by one. As a result, the sub chip 120 outputs an NG_(n+1) packet.

On the other hand, when the transmission control unit 401 determines that the received packet is not the NG_n packet (NO in step S1204), the processing proceeds to step S1206. Processing in step S1206 is similar to the processing in step S705 illustrated in FIG. 7, and redundant descriptions thereof will be omitted.

[Control by Sub Chips 130 and 140]

Also according to the second exemplary embodiment, the control by the sub chips 130 and 140 is different from the control by the sub chip 120 only in the wait time. Therefore, a flowchart illustrating the control by the sub chips 130 and 140 will be omitted. Since the sub chip 130 needs to additionally wait for the sub chip 120 for a time period a for the reason given in the first exemplary embodiment, the sub chip 130 needs to monitor packet reception for a time period Tw1+α from time t0. Since the sub chip 140 needs to additionally wait for the sub chip 130 for another time period a for the reason given in the first exemplary embodiment, the sub chip 140 needs to monitor packet reception for a time period Tw1+2α from time t0. More specifically, when performing the control by the sub chip 130, "Tw1" in step S1202 illustrated in FIG. 12 is replaced with "Tw1+α". Further, when performing the control by the sub chip 140, "Tw1" in step S1202 illustrated in FIG. 12 is replaced with "Tw1+2α".

[Control by Main Chip 110]

Figure 13:
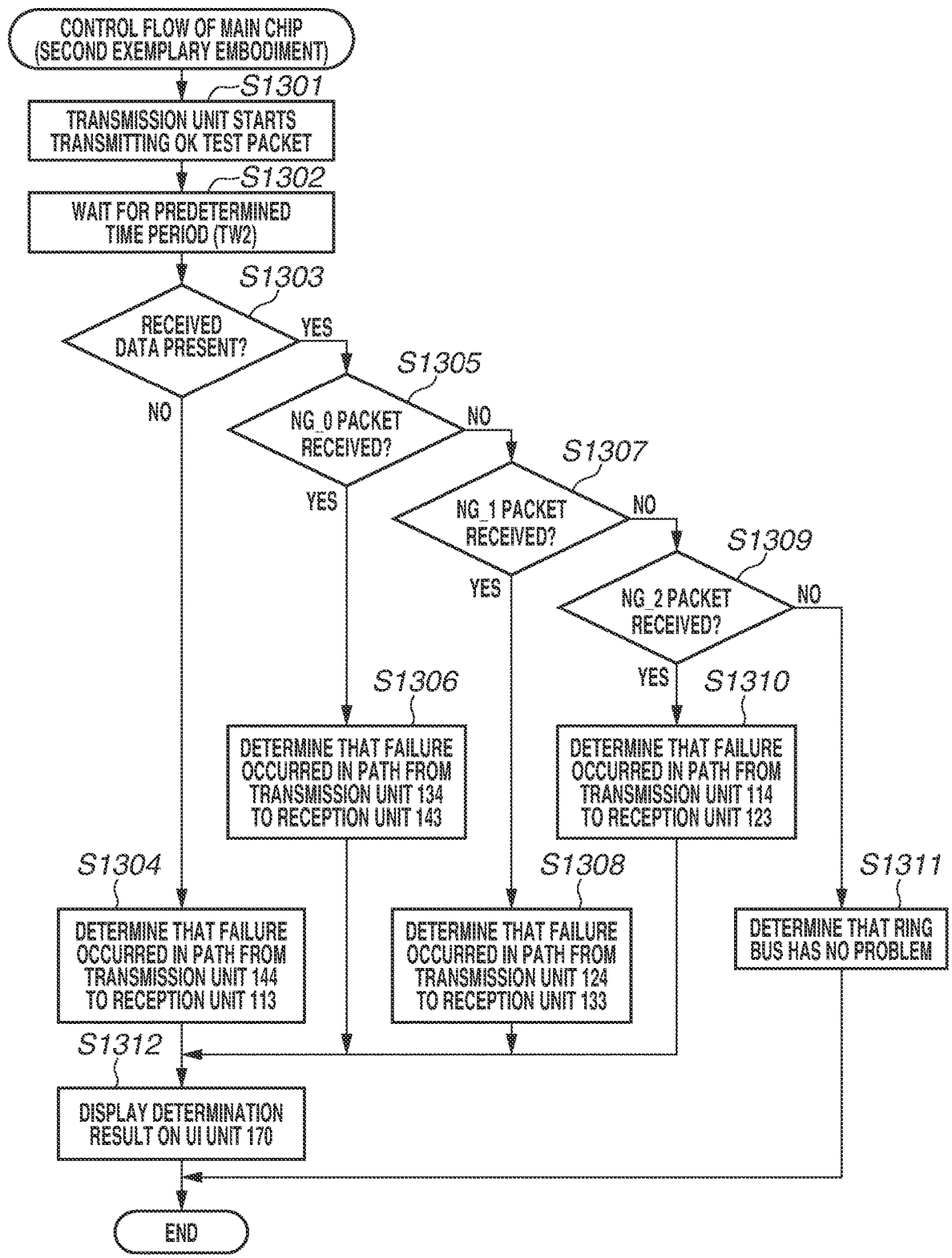
FIG. 13 is a flowchart illustrating control processing of the main chip according to the second exemplary embodiment.

FIG. 13 is a flowchart illustrating control processing of the main chip 110 according to the second exemplary embodiment. Processing of this flowchart is performed under the control of the main control unit 112 of the main chip 110.

Processing in steps S1301 to S1304 is similar to the processing in step S801 to S804 illustrated in FIG. 8, and redundant descriptions thereof will be omitted. However, when the main control unit 112 determines that a packet is received in the wait time in step S1302 (YES in step S1303), the processing proceeds to step S1305.

In step S1305, the main control unit 112 checks the packet (test packet) stored in the test packet storage unit 530 to determine whether the test packet is an NG_0 packet. When the main control unit 112 determines that the test packet is an NG_0 packet (YES in step S1305), the processing proceeds to step S1306.

In step S1306, since the received NG_0 packet indicates that the just preceding sub chip 140 has generated the NG_0 packet, the main control unit 112 determines that a failure has occurred in the path from the transmission unit 134 of the sub chip 130 (sub chip preceding two stages) to the reception unit 143 of the sub chip 140, and presumes the failure location and error factor based on the error status information included in the received NG_0 packet.

On the other hand, when the main control unit 112 determines that the test packet is not the NG_0 packet (NO in step S1305), the processing proceeds to step S1307.

In step S1307, the main control unit 112 determines whether the test packet is an NG_1 packet. When the main control unit 112 determines that the test packet is the NG_1 packet (YES in step S1307), the processing proceeds to step S1308.

In step S1308, since the received NG_1 packet indicates that the preceding sub chip 130 (sub chip preceding by two stages) has generated the NG_0 packet, the main control unit 112 determines that a failure has occurred in the path from the transmission unit 124 of the sub chip 120 (sub chip preceding by three stages) to the reception unit 133 of the sub chip 130, and presumes the failure location and factor based on the error status information included in the received NG_1 packet.

On the other hand, when the main control unit 112 determines that the test packet is not the NG_1 packet (NO in step S1307), the processing proceeds to step S1309.

In step S1309, the main control unit 112 determines whether the test packet is an NG_2 packet. When the main control unit 112 determines that the test packet is the NG_2 packet (YES in step S1309), the processing proceeds to step S1310.

In step S1310, since the received NG_2 packet indicates that the preceding sub chip 120 (sub chip preceding by three stages) generated the NG_0 packet, the main control unit 112 determines that a failure has occurred in the path from the transmission unit 114 of the main chip 110 to the reception unit 123 of the sub chip 120, and presumes the failure location and error factor based on the error status information included in the received NG_2 packet.

On the other hand, when the main control unit 112 determines that the test packet is not the NG_2 packet (NO in step S1309), the processing proceeds to step S1311.

In step S1311, the main control unit 112 determines that no failure has occurred in the ring bus transmission path, and the processing exits this flowchart.

After the processing in step S1304, S1306, S1308, or S1310 is performed, in steps S1312, the main control unit 112 displays the determination and presumption results in step S1304, S1306, S1308, or S1310 on the UI unit 170, and the processing exits this flowchart.

As described above, it is possible, if a failure occurs in the ring-shaped bus, to detect the failure location and presume the error factor even in the image processing apparatus 100 in which a sub chip including the transmission unit provided with no chip identification information storage unit 430 according to the second exemplary embodiment is connected to the main chip 110 via the ring-shaped bus.

In the case of the control by the sub chip illustrated in the FIG. 12, in step 51205, the transmission control unit 401 controls the NG packet change unit 1160 to increment the value in the passage number area (passage number) of the packet by one. However, the method for changing the passage number performed by the sub chip having received the NG packet is not limited to "increment by one" as described above. The method for changing the passage number is not limited to a particular configuration as long as the passage number generated with a predetermined initial value (not limited to 0) is changed based on a predetermined rule when the NG packet is output to the bus. For example, the passage number may be changed in such a way that the initial value of the passage number when generating the NG packet is set to "100", and the passage number is decremented by one by the sub chip through which the NG packet passes.

Further, the passage number may be changed in such a way that the passage number area is provided also in the OK packet, and the transmission unit 124 of each sub chip changes the passage number of the OK packet before transmitting the OK packet.

According to each of the exemplary embodiments, the NG_packet includes information (identification information) for identifying the NG packet generation source sub chip to identify the failure location in the ring-shaped bus. According to the first exemplary embodiment, the NG_packet includes the ID (chip ID) specific to the NG packet generation source. According to the second exemplary embodiment, the NG_packet includes the passage number and the NG packet generation source sub chip is identified by using the passage number, so that the failure location in the ring-shaped bus is identified. However, the identification information included in the NG packet is not limited to the chip ID and passage number and may be other information as long as the NG packet generation source sub chip can be identified.

In each of the exemplary embodiments, the present invention is applied to an image processing apparatus. However, the present invention is applicable to any apparatus as long as the apparatus has a configuration in which a main module (such as the main chip 110) and at least one sub module (such as the sub chips 120 to 140) are connected in a ring shape by a ring bus. For example, the present invention is applicable also to various types of information processing apparatuses such as household appliances.

As illustrated above, according to the present invention, it is possible to identify the failure location and error factor even if a failure occurs in a ring-shaped bus. As a result, it becomes possible to reduce the cost of failure location analysis and improve the maintainability of the apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-151027, filed Aug. 1, 2016, which is hereby incorporated by reference herein in its entirety.

What is claimed is:

1. An information processing apparatus, comprising:
   a first processing unit including a first transmitter configured to transmit first data on a basis of powering the information processing apparatus and a first receiver configured to receive data transmitted from a second processing unit;
   the second processing unit including a second receiver configured to receive the first data transmitted by the first transmitter and a second transmitter configured to transmit the first data transmitted from the first transmitter and second data to the first receiver;
   wherein the second data is data which is to be transmitted in a situation that the second receiver has not received the first data transmitted from the first transmitter since the information processing apparatus was powered; and
   wherein, based on whether or not the first receiver received the first data transmitted by the second transmitter and whether or not the first receiver received the second data transmitted by the second transmitter, the first processing unit identifies failure location on a transmission path of the first data and the data,
   wherein the first processing unit and the second processing unit are connected in a ring bus.

2. The information processing apparatus according to claim 1,
   wherein, based on data received by the receiver before a lapse of a predetermined time period since transmission of the data by the first transmitter, the first processing unit identifies a failure location on the transmission path.

3. The information processing apparatus according to claim 2,
   wherein the predetermined time period is a time period measured from when the information processing apparatus is powered.

4. The information processing apparatus according to claim 1,
   wherein the first data is data that contains information for identification of success of transmission of the first data;
   wherein the second data is data that contains information for identification of an error.

5. The information processing apparatus according to claim 1,
   wherein the second transmitter transmits the first data received by the second receiver without change.

6. The information processing apparatus according to claim 1,
   wherein, based on receiving the transmitted first data by the first receiver, the first processing unit identifies that there is no failure on the transmission path of the data.

7. The information processing apparatus according to claim 1, further comprising:
   a display configured to display the failure location identified by the first processing unit.

8. The information processing apparatus according to claim 1,
   wherein the second data contains an ID of the second processing unit.

9. The information processing apparatus according to claim 1, further comprising:
   a scanner configured to scan an image of a document;
   wherein the second processing unit includes
      a scan image processor configured to perform image processing on image data outputted from the scanner and output the processed image data to the first processing unit.

10. The information processing apparatus according to claim 1, further comprising:
   a printer;
   wherein the second processing unit includes
      a print image processor configured to perform image processing on image data outputted from the first processing unit and output the processed image data to the printer.

11. The information processing apparatus according to claim 1,
   wherein the first processing unit is one chip, and
   wherein the second processing unit is another one chip that is different from the first processing unit.

12. The information processing apparatus according to claim 1,
   wherein the second data contains a number of processing units which said another data has passed through.

13. The information processing apparatus according to claim 1,
   wherein, based on not receiving the first data by the first receiver, the first processing unit determines that there is a failure on the transmission path of the data from the second transmitter to the first receiver.

14. The information processing apparatus according to claim 1,
   wherein, based on receiving the second data and not receiving the first data by the first receiver, the first processing unit determines that there is a failure on the transmission path of the data from the first transmitter to the second receiver.

15. The information processing apparatus according to claim 1, wherein the second transmitter transmits the second data without receiving the first data.

16. The information processing apparatus according to claim 1, where the second data is a data indicating the second receiver has not received the first data.

17. The information processing apparatus according to claim 1, further comprising:
   a third processing unit including a third receiver configured to receive the first data and the second data transmitted by the second transmitter and a third transmitter configured to transmit the first data and the second data transmitted from the second transmitter to the first receiver,
   wherein the second transmitter transmits the first data and the second data to the third receiver.

18. The information processing apparatus according to claim 17, wherein the first processing unit, the second processing unit and the third processing unit are connected in a ring bus.

19. A method for controlling an information processing apparatus comprising a first processing unit including a first transmitter and a first receiver and a second processing unit including a second receiver and a second transmitter, the method comprising:
   transmitting first data from the first transmitter on a basis of powering the information processing apparatus;
   receiving, using the first receiver, data transmitted from the second processing unit;
   receiving, using the second receiver, the first data transmitted by the first transmitter and transmitting, using the second transmitter, the first data transmitted from the first transmitter and second data to the first receiver;
   wherein the second data is data which is to be transmitted in a situation that the second receiver has not received the first data transmitted from the first transmitter since the information processing apparatus was powered; and
   wherein, based on whether or not the first receiver received the first data transmitted by the second transmitter and whether or not the first receiver received the second data transmitted by the second transmitter, the first processing unit identifies failure location on a transmission path of the first data and the data,
   wherein the first processing unit and the second processing unit are connected in a ring bus.

20. The method according to claim 19, wherein the information processing apparatus further comprises a third processing unit including a third receiver and a third transmitter,
   receiving, using the third receiver, the first data and the second data transmitted by the second transmitter;
   transmitting, using the third processing unit, the first data and the second data transmitted from the second transmitter to the first receiver,
   wherein the first data and the second data is transmitted to the third receiver using the second transmitter.

21. The method according to claim 20, wherein the first processing unit, the second processing unit and the third processing unit are connected in a ring bus.

* * * * *